United States Patent Office 3,545,949
Patented Dec. 8, 1970

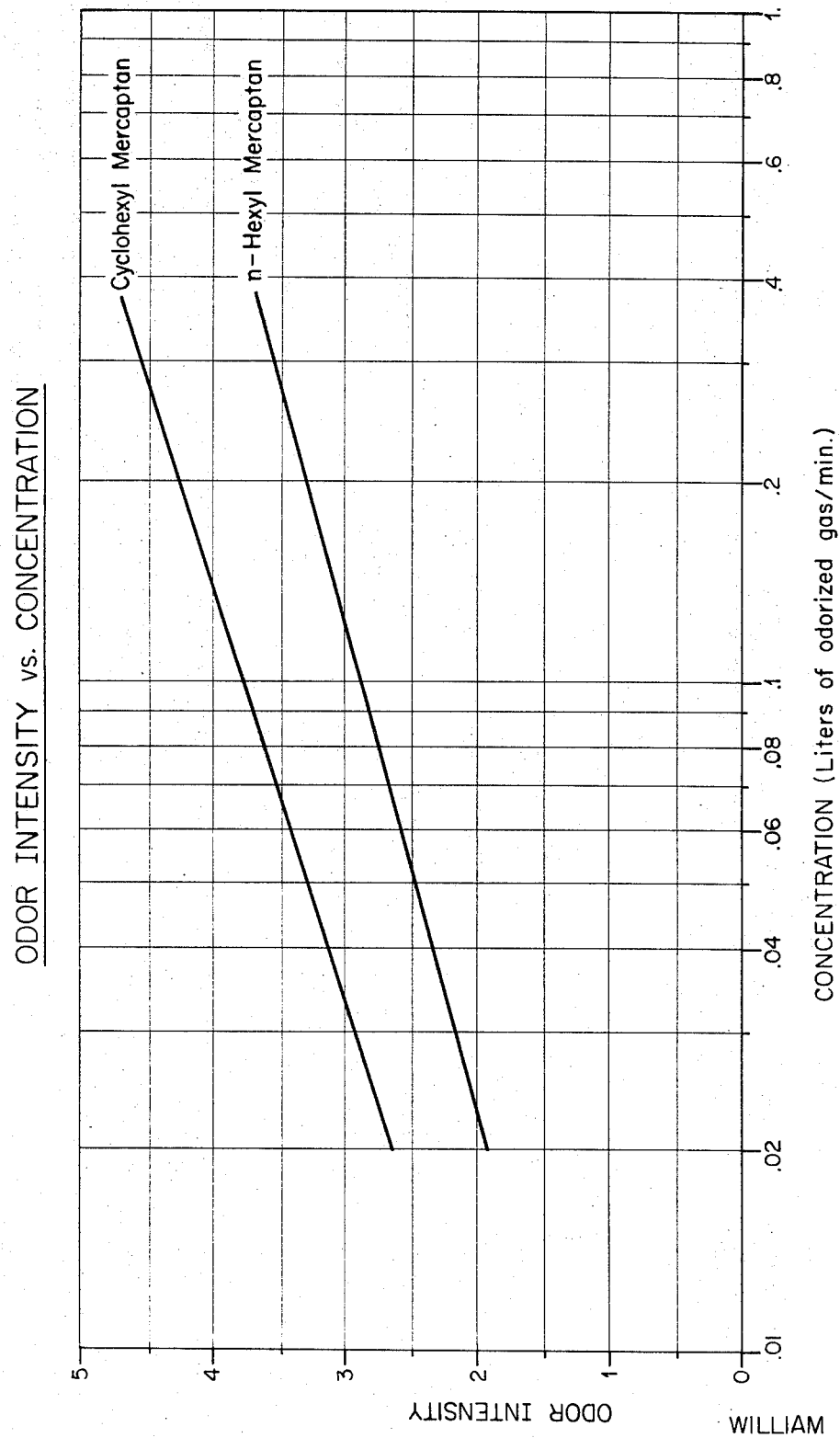

3,545,949
ODORIZED GAS
William Harry Oister, Pennsauken, N.J., assignor to Pennwalt Corporation, Philadelphia, Pa., a corporation of Pennsylvania
Filed Apr. 3, 1968, Ser. No. 718,621
Int. Cl. C01j 1/28; C09k 3/02; G01n 33/00
U.S. Cl. 48—195
3 Claims

ABSTRACT OF THE DISCLOSURE

Use of cyclohexyl mercaptan as a gas odorant.

---

Natural gas is usually odorized with mercaptans, alkyl sulfides, cyclic sulfides or various blends of two or more of the preceding. However, when the properties of these materials are compared with those of a theoretically ideal odorant, all will be found to be deficient in one or more areas. Some of the recognized features of an ideal odorant would be high odor strength, high odor impact, high stability under pipeline conditions, moderate volatility, low corrosivity, and low toxicity. Of the above features, odor strength (basically odor detectability of the material at low concentrations) and odor impact (the ability of a particular odor to arrest attention) are probably of primary importance because these are the features which allow the detection of gas before it reaches hazardous concentrations. It is generally recognized that of the above materials, the mercaptans offer the highest odor intensity and the highest odor impact. However, it is also known that under certain pipeline conditions mercaptans are not stable because they are readily oxidized to essentially non-odorous materials. The alkyl sulfides and cyclic sulfides offer greater stability than mercaptans and have odor intensities similar to mercaptans, but generally have been less widely accepted because they lack the odor impact offered by mercaptans.

Of the mercaptans, t-butyl mercaptan has been the preferred material to be used commercially as a gas odorant because it is the least susceptible of the lower alkyl mercaptans to oxidation, and consequently is the base for the majority of the gas odorants used today. It is generally necessary to blend the t-butyl mercaptan with other materials because it has a comparatively high freezing point (1° C.). However, when t-butyl mercaptan is blended with other mercaptans it becomes even more susceptible to oxidation. (It has been indicated that low molecular weight mercaptans promote the conversion of higher molecular weight mercaptans to disulfides.) If "inert" and non-odorous materials (such as hydrocarbons) are used as anti-freeze agents for the t-butyl mercaptan, the mixture of course would have a lower odor intensity than pure t-butyl mercaptan. If a sulfide is used as the diluent, even though it is generally felt that the odor intensity and odor impact of this mixture is equivalent to that of the undiluted t-butyl mercaptan, this technique is undesirable because it involves extra time and expense to produce a blend which would meet the necessary specifications for the product.

It has now been found that cyclohexyl mercaptan has a unique combination of properties, particularly high odor strength, high odor impact, and resistance to oxidation, which presents substantial improvement over materials currently being used as gas odorants. In accord with the invention, there is now provided an improved method for odorizing gaseous materials which comprises mixing with said gases an odorizing amount of cyclohexyl mercaptan. Another embodiment of the invention comprises gases containing an odorizing amount of cyclohexyl mercaptan.

It will be understood that the gases which may be treated with cyclohexyl mercaptan will include natural gas, manufactured hydrocarbon gases, refrigerant gases and the like. It will also be understood that other conventional odorants may be blended with the cyclohexyl mercaptan if desired.

The usual odorant procedures will be used with cyclohexyl mercaptan as odorant. Normally natural gas is odorized with 0.25 to 1.0 lb. of odorant per $10^6$ cu. ft. of gas. When odorized at these rates the gas usually has no difficulty in meeting the legal specifications of being detectable at about one quarter of its lower explosive limit (or at about 1% in air). In the usual procedure the cyclohexyl mercaptan is injected directly into the gas stream at the desired rate. Alternatively, the gas may be odorized with odorant diluted with an inert gas or a dilute solution of the odorant may be used. Also, sometimes in transmission systems the gas to be odorized is at considerably higher pressures, up to about 500 or 600 p.s.i. and cyclohexyl mercaptan is also suitable in such a system since sufficient odorant may be dissolved in the gas at this pressure and at reasonable temperature extremes to give adequate warning levels. Also, on a commercial scale an alternate method to injection odorization is by-pass odorization. In the by-pass method, a portion of the gas stream is allowed to contact odorant vapor or liquid and become rich in odorant vapor, and it is then returned to the main gas stream. The amount of gas "by passed" is varied so that the total amount of odorant added to the main gas stream is usually within the specified concentration limits of about 0.25 to 1 lb. of odorant/MM c.f. The cyclohexyl mercaptan is also suited for use in this type of odorizer, and in many respects it is superior to odorants which are now commercially available and recommended for use in this type of odorizer since, as a single compound, the cyclohexyl mercaptan is not susceptible to "fractionation" as are odorants which are blends of two or more materials.

As indicated, it is not necessary to modify the properties of cyclohexyl mercaptan for its use as a gas odorant and the preferred odorant is 100% cyclohexyl mercaptan. However, it is recognized that some may still prefer to have a blended or diluted material, and the features of cyclohexyl mercaptan are compatible with this. It can be blended with other mercaptans where it may be either the major or minor portion of the blend, for example (a) it can be used as a minor portion as the anti-freeze for an odorant with t-butyl mercaptan as the major portion, or (b) it can replace t-butyl mercaptan as the major portion in odorants such as are now commercially available, (c) it can be blended with other mercaptans in portions not currently used. It can also be blended with alkyl or cyclic sulfides and again be the major or minor part of the blend. It may also be blended with what are normally considered inert and/or non-odorous diluents and in any practical or desired proportions.

While the primary area of use is the odorization of nautral gas, either in transmission systems or distribution systems, and either as a primary odorant or as a supplemental odorant, it is to be understood that cyclohexyl mercaptan is suitable for odorizing other hazardous or non-hazardous gases to which it is desired to impart an odor. This also includes liquified gases such as liquified petroleum gas (LPG).

Cyclohexyl mercaptan is a known compound which may be prepared by the method of Stanek as reported in Chemical Abstracts, vol. 47, 4296 (1953).

In order to further illustrate the invention and to indicate the surprising superiority of cyclohexyl mercaptan as an odorant, the following examples are given:

EXAMPLE I

Odor intensity

Cyclohexyl mercaptan and tertiarybutyl mercaptan (the odorant of commerce) were evaluated for odor intensity in accordance with the method described in the article by Ashley D. Nevers entitled "How Odorants Are Evaluated by Use of New Apparatus" which appeared in American Gas Journal (1955), but using an expanded scale of odor intensities as set forth in Table I which follows.

fitted to these points by the method of least squares. In this way the odor intensity vs. concentration curves shown in the figure were obtained. Treatment of the data in this manner is well known in the art and is based on the Fechner-Weber relationship which states that the intensity of any sensory response is proportional to the logarithm of the stimulus (R. W. Moncrieff, "The Chemical Senses," pp. 67–68, University Press, 1951; E. A. M. Gamble, "The Applicability of Weber's Law to Smell," American Journal of Psychology, 1896, 10, 82–142).

The curves of the figure clearly show the unexpected superiority of cyclohexylmercaptan over hexylmercaptan.

TABLE I

[Odor intensity cyclohexyl mercaptan/ethanol (Test 1) vs. t-butyl mercaptan/ethanol (Test 2)]

| | Order of presentation | Subject No. 1 Test | | Subject No. 2 Test | | Subject No. 3 Test | | Subject No. 4 Test | | Subject No. 5 Test | | Subject No. 6 Test | | Average test | |
|---|---|---|---|---|---|---|---|---|---|---|---|---|---|---|---|
| | | 1 | 2 | 1 | 2 | 1 | 2 | 1 | 2 | 1 | 2 | 1 | 2 | 1 | 2 |
| Concentration:[1] | | | | | | | | | | | | | | | | |
| 0 | 3 | 2 | .5 | 2 | 0 | 0 | 0 | 1 | 1 | 2 | 0 | 1 | 0 | 1.3 | 0.3 |
| .02 | 5 | 2 | 0 | 4 | 3 | 1 | 2 | 3 | 2 | 2 | 2 | 2 | 2 | 2.3 | 1.8 |
| .044 | 1 | 3 | 3 | 3.5 | 5 | 3 | 2 | 2 | 3 | 5 | 3 | 2 | 3 | 3.1 | 3.2 |
| .096 | 6 | 3 | 2 | 5 | 4 | 3 | 2.5 | 4 | 4 | 3 | 3 | 4 | 4 | 3.7 | 3.3 |
| .20 | 2 | 4 | 4 | 4.5 | 4 | 4 | 3 | 4 | 4 | 5 | 4 | 5 | 4 | 4.4 | 3.8 |
| .385 | 4 | 4 | 4 | 5 | 5 | 4 | 4 | 5 | 5 | 4 | 4 | 5 | 5 | 4.5 | 4.5 |

[1] Flow rate of odorized gas in l/minute.

NOTE.—Intensities: 0=same as air; 1=threshold; 2=faint; 3=moderate; 4=strong; 5=overpowering.

In these tests the methane at low pressures (about 5 p.s.i.) was odorized by injecting a dilute solution of the odorant into the gas stream at a rate of 0.42 lb. of odorant per $10^6$ cubic feet.

Table I indicates the results of the test on six different subjects.

For example, to produce a moderate odor intensity of 3.0, a cyclohexylmercaptan concentration of 0.033 liter of odorized gas/min. is required. However, with hexylmercaptan a concentration of 0.120 liter of odorized gas/min. is needed for the same 3.0 odor intensity. Thus, the significant superiority of cyclohexylmercaptan is clear.

TABLE II

[Odor intensity n-hexyl mercaptan vs. cyclohexyl mercaptan]

| | Order of presentation | Subject No. 1 Test | | Subject No. 2 Test | | Subject No. 3 Test | | Subject No. 4 Test | | Subject No. 5 Test | | Subject No. 6 Test | | Average test | |
|---|---|---|---|---|---|---|---|---|---|---|---|---|---|---|---|
| | | 1 | 2 | 1 | 2 | 1 | 2 | 1 | 2 | 1 | 2 | 1 | 2 | 1 | 2 |
| Concentration:[1] | | | | | | | | | | | | | | | | |
| 0 | 3 | 0 | 3 | 0 | 1 | 3 | 1 | 3 | 1 | 3 | 0 | 2 | 0 | 1.8 | 1.0 |
| .02 | 5 | 2 | 3 | 1 | 3 | 3 | 2 | 2 | 2 | 2 | 1 | 2 | 2 | 2.0 | 2.3 |
| .044 | 1 | 4 | 5 | 0 | 3.5 | 3 | 5 | 3 | 4 | 3.5 | 2 | 1.5 | 3 | 2.5 | 3.8 |
| .096 | 6 | 4 | 5 | 3 | 3.5 | 3 | 5 | 3 | 3.5 | 3 | 1 | 1.5 | 2 | 2.6 | 3.6 |
| .20 | 2 | 3 | 5 | 2 | 4.5 | 5 | 5 | 4 | 5 | 4 | 3 | 3 | 4 | 3.5 | 4.4 |
| .385 | 4 | 5 | 5 | 1.5 | 4 | 5 | 5 | 4 | 4 | 3 | 5 | 3 | 4 | 3.6 | 4.5 |

[1] Flow rate of odorized gas in l./min.

NOTE.—Test 1, n-hexyl mercaptan; Test 2, cyclohexyl mercaptan.

It is clear from Table I that the odor intensity of cyclohexyl mercaptan is at least equal to that of t-butyl mercaptan and this was confirmed by an analysis of variance of the data which actually shows a significant difference at the 99% level that cyclohexyl mercaptan has the stronger odor. The odor impact of cyclohexyl mercaptan was also found to exceed that of t-butyl mercaptan.

EXAMPLE II

Comparison with n-hexylmercaptan

Using the test method of Example I the data of Table II was obtained.

The data in Table II was submitted for an analysis of variance and it was concluded that the differences in odor intensity between n-hexyl mercaptan and cyclohexyl mercaptan were significant at the 99% level (i.e., there is less than 1 chance per 100 that the odor intensity of cyclohexyl mercaptan is not stronger than the odor intensity of n-hexyl mercaptan).

In addition to the analysis of variance, the average odor intensities of Table II were plotted against the logarithm of the concentration of the tests and a straight line was

EXAMPLE III

Oxidation stability

Oxidation stability tests were carried out by the following procedure:

An eight ounce aerosol compatibility tube used as a pressure reactor was flushed with oxygen for one to five minutes and the tube was then sealed and checked for leaks by immersion in a hot water bath. Then, 1 ml. of odorant was injected into the tube through a rubber septum using a hypodermic syringe. The apparatus was placed in a water bath at 50° C. and pressure changes were measured with a compound pressure gauge. The data obtained are shown in Table III.

TABLE III

Oxidation stability of odorants

Odorant:                    Pressure drop n-Butyl mercaptan ____ 4.6 p.s.i. after 8 days.

n-Hexyl mercaptan ___ 1.7 p.s.i. after 6 days.

Cyclohexyl mercaptan _ 0.1 p.s.i. after 6 days; 0.1 p.s.i. after 8 days; 0.5 p.s.i. after 15 days.

It is clear from the data of the above Table III that the oxidation stability of cyclohexyl mercaptan is significantly better than that of n-hexyl-mercaptan and n-butyl mercaptan. This property of improved oxidation stability, together with the high ordor intensity and high impact of cyclohexylmercaptan, makes it of extreme value as a gas odorant, and accordingly this invention is a significant contribution to the art.

It will be understood that numerous changes and variations may be made in the above description and examples without departing from the spirit and scope of the invention.

I claim:

1. In a process of odorizing a gas selected from the group consisting of natural gases, manufactured hydrocarbon gases and refrigerant gases, the improvement which comprises mixing said gas with from 0.25 to 1.0 lb. of cyclohexylmercaptan per million cubic feet of gas.

2. The odorized gas selected from the group consisting of natural gases, manufactured hydrocarbon gases and refrigerant gases containing from 0.25 to 1.0 lb. of cyclohexylmercaptan per million cubic feet of gas.

3. Natural gas containing as an odorant 0.25 to 1.0 lb. of cyclohexylmercaptan per million cubic feet of gas.

References Cited

UNITED STATES PATENTS 3,069,472   12/1962   Loev et al. _____ 260—609D

OTHER REFERENCES

Arnold et al.: Chem. Abs., vol. 47, 5673a (1953).

JOSEPH SCOVRONEK, Primary Examiner

U.S. Cl. X.R.

44—52, 59; 48—196, 197; 73—23; 252—68